(12) United States Patent
Nitsch et al.

(10) Patent No.: US 10,602,341 B2
(45) Date of Patent: Mar. 24, 2020

(54) RESTRICTING THE NUMBER OF TIMES A SUBSCRIPTION PROFILE FOR AN EUICC CAN BE DOWNLOADED

(71) Applicant: GIESECKE+DEVRIENT MOBILE SECURITY GMBH, München (DE)

(72) Inventors: Nils Nitsch, Markt Schwaben (DE); Ulrich Huber, München (DE)

(73) Assignee: GIESECKE+DEVRIENT MOBILE SECURITY GMBH, München (DE)

( * ) Notice: Subject to any disclaimer, the term of this patent is extended or adjusted under 35 U.S.C. 154(b) by 238 days.

(21) Appl. No.: 15/766,128

(22) PCT Filed: Oct. 6, 2016

(86) PCT No.: PCT/EP2016/001659
§ 371 (c)(1),
(2) Date: Apr. 5, 2018

(87) PCT Pub. No.: WO2017/059957
PCT Pub. Date: Apr. 13, 2017

(65) Prior Publication Data
US 2018/0288607 A1 Oct. 4, 2018

(30) Foreign Application Priority Data
Oct. 7, 2015 (DE) .......... 10 2015 012 941

(51) Int. Cl.
*H04W 8/18* (2009.01)
*H04W 12/00* (2009.01)
(Continued)

(52) U.S. Cl.
CPC .......... *H04W 8/183* (2013.01); *H04L 9/3213* (2013.01); *H04W 8/205* (2013.01);
(Continued)

(58) Field of Classification Search
CPC ....... H04W 8/18; H04W 12/00; H04W 12/12; H04W 9/32; H04W 12/04; H04W 12/08;
(Continued)

(56) References Cited

U.S. PATENT DOCUMENTS 9,088,457 B1 7/2015 Johnson
9,706,512 B2 7/2017 Suh
(Continued)

FOREIGN PATENT DOCUMENTS

| DE | 102013004609 A1 | 7/2014 |
| WO | 2014171707 A1 | 10/2014 |
| WO | 2014184611 A1 | 11/2014 |

OTHER PUBLICATIONS

"Embedded SIM Remote Provisioning Architecture Version 1.1," GSM Association, Dec. 17, 2013, 84 Pages.
(Continued)

*Primary Examiner* — Jayesh M Jhaveri
(74) *Attorney, Agent, or Firm* — Workman Nydegger

(57) ABSTRACT

A loading package is adapted for loading a profile for a subscription into a subscriber identity module. A loading sequence through the implementation of which in the subscriber identity module the profile is set up in the subscriber identity module. A profile loading counter sequence is generated on the basis of a counter reading of a profile loading counter maintained at a data preparation server; is adapted to load into the subscriber identity module a profile loading counter with the generated counter reading; and is loaded into the subscriber identity module before the loading sequence. The profile loading counter sequence is further adapted if no implemented profile loading counter is present in the subscriber identity module, to implement the profile-loading counter in the subscriber identity module with a counter reading which determines an admissible number of
(Continued)

times which the loading package may be loaded into the subscriber identity module.

9 Claims, 2 Drawing Sheets

(51) Int. Cl.
    *H04W 12/04*     (2009.01)
    *H04W 12/08*     (2009.01)
    *H04W 12/12*     (2009.01)
    *H04L 9/32*     (2006.01)
    *H04W 8/20*     (2009.01)

(52) U.S. Cl.
    CPC ....... *H04W 12/0023* (2019.01); *H04W 12/04* (2013.01); *H04W 12/08* (2013.01); *H04W 12/1206* (2019.01)

(58) Field of Classification Search
    CPC ... H04W 8/20; H04W 8/183; H04W 12/1206; H04W 12/0023; H04W 9/3213; H04W 8/205
    See application file for complete search history.

(56) References Cited

U.S. PATENT DOCUMENTS

| | | | |
|---|---|---|---|
| 2006/0090077 A1* | 4/2006 | Little | G06F 21/10 |
| | | | 713/184 |
| 2012/0190354 A1 | 7/2012 | Merrien et al. | |
| 2013/0129086 A1 | 5/2013 | Tang et al. | |
| 2015/0193224 A1* | 7/2015 | Ziat | G06F 8/65 |
| | | | 717/172 |
| 2016/0057725 A1 | 2/2016 | Suh | |
| 2016/0105411 A1* | 4/2016 | Vallieres | H04L 9/12 |

OTHER PUBLICATIONS

"Remote Provisioning Architecture for Embedded UICC Technical Specification Version 2.0," GSM Association Oct. 13, 2014, 293 Pages.

German Office Communication from DE Application No. DE 10 2015 012 941.4, dated Jul. 6, 2016.

International Search Report from PCT Application No. PCT/EP2016/001659, dated Jan. 2, 2017.

* cited by examiner

US 10,602,341 B2

RESTRICTING THE NUMBER OF TIMES A SUBSCRIPTION PROFILE FOR AN EUICC CAN BE DOWNLOADED

FIELD OF THE INVENTION

The invention relates to a loading package and a method for loading a profile for a subscription (subscription profile) into a subscriber identity module.

STATE OF THE ART

Mobile terminals are operated securely in mobile communication networks by means of subscriber identity modules, also referred to as Secure Elements. As mobile terminals, in particular mobile communication terminals, such as for example smart phones, as well as M2M terminals can be provided.

Within the scope of setting up a subscriber identity module, a subscription profile has to be loaded into the subscriber identity module. Change requests of the subscription profile (or short only profile) require supplying a changed subscription profile. In the case of plug-in SIM cards for mobile communication terminals, the change can be carried out by exchanging the SIM card. Alternatively, a new subscription profile is loaded into the subscriber identity module, which is carried out in particular for permanently soldered-in subscriber identity modules (e.g. eUICC in mobile communications or permanently soldered-in M2M module), which cannot be exchanged easily. The management of subscriptions, in particular by downloading subscription profiles and accompanying data into a subscriber identity module, is generally referred to as subscription management.

The technical specifications [1] 12FAST.13—Embedded SIM Remote Provisioning Architecture 17 Dec. 2013", GSMA, and [2] SGP02-Remote-Provisioning-Architecture-for-embedded-UICC-Technical-Specification-v2.0, 13 Oct. 2014 GSMA, describe the downloading and installing of a subscription profile in an eUICC. According to [1] 12FAST.13 the loading of a subscription profile into a subscriber identity module involves a Subscription Management Data Preparation SM-SP and a Subscription Management Secure Router SM-SR. The Subscription Management Data Preparation SM-SP has information specific to the subscriber identity module and, on the basis of the subscription profile, produces therefrom a loading package to be loaded into the subscriber identity module. The loading package comprises an encrypted loading sequence specific to the subscriber identity module which corresponds to the subscription profile, and on the basis of which the subscription profile can be implemented in the subscriber identity module. The Subscription Management Data Preparation SM-SP supplies the loading package to the Subscription Management Secure Router SM-SR, which loads the loading package into the subscriber identity module. By implementation processes in the subscriber identity module, which are not important in connection with the invention and will not be considered further therefore, the subscription profile is finally implemented in the subscriber identity module. [2] SGP02, chapter 3 describes the sequence of protocol when downloading and installing a subscription profile into an eUICC. The Subscription Management Data Preparation SM-SP is hereinafter called "Daten-Aufbereitungsserver SM-DP" in German (data preparation server SM-DP); the Subscription Management Secure Router SM-SR is called "Sicherheits-Router SM-SR" in German (security router SM-SR).

To prevent loading the loading package into several different subscriber identity modules, i.e. so as to prevent cloning of a subscription profile for use in several subscriber identity modules, the loading sequence contained in the loading package is encrypted in a manner specific to the subscriber identity module.

It cannot be prevented by this measure, however, that a loading package is loaded several times into one and the same subscriber identity module and installed there. It will be shown in the following why this loading a loading package several times into one and the same subscriber identity module, which is a harmless measure at first glance, can be problematic. Use contracts for subscription profiles can be limited in time by the network operator. To enforce the time limit, it can be provided that the network operator deactivates the subscription profile implemented in the subscriber identity module via remote access to the subscriber identity module on the occasion of the expiration of contract. A user could attempt to circumvent the time limit of the use contract by again requesting the loading of the loading package into the subscriber identity module after the remote deactivation, pretending that he had not yet received the profile.

SUMMARY OF THE INVENTION

It is the object of the invention to create a loading package and a method for loading a profile for a mobile communication subscription (subscription profile) into a subscriber identity module, in which a circumvention of use restrictions, in particular time limits, is made difficult or is preferably prevented. In particular, a repeated loading of a subscription profile into a subscriber identity module is to be prevented.

The object is achieved by a loading package according to claim 1. Advantageous embodiments of the invention are specified in the dependent claims.

The loading package according to the invention is adapted to load a profile for a subscription into a subscriber identity module and comprises a loading sequence by the implementation of which in the subscriber identity module the profile is set up in the subscriber identity module. The loading package is characterized by a profile loading counter sequence. Said sequence is generated on the basis of a counter reading of a profile loading counter maintained in a data preparation server, which is changed, in particular incremented, on the occasion of a transfer of the loading package from the data preparation server to the subscriber identity module. Further, the profile loading counter sequence is adapted to load a profile loading counter with the generated counter reading into the subscriber identity module. The profile loading counter sequence for the counter is loaded into the subscriber identity module before the loading sequence for the profile, thus extracted from the transmitted loading package.

If no implemented profile loading counter is present in the subscriber identity module, the profile loading counter is implemented in the subscriber identity module with a counter reading which determines an admissible number of times which the loading package can be loaded into the subscriber identity module. If an implemented profile loading counter is already present in the subscriber identity module, its counter reading is checked for whether an admissible number of times which the loading package has already been loaded into the subscriber identity module or/and has been implemented is still undershot in accordance with the counter reading in the subscriber identity module. The loading or/and implementation of the loading sequence, thus ultimately of the profile, is allowed at most only if the admissible number is still undershot, and otherwise the loading or/and implementation of the loading sequence (PL) is prevented.

Through the loading counter set up in the loading package itself it is made possible to check the admissibility of the profile loading process on the basis of the loading package itself. Upon initial loading of a profile, the profile loading counter is set up in the subscriber identity module and is set up with the admissible maximum number (number) of implementation processes for the same profile. For each subsequent loading of the same profile the profile loading counter at the data preparation server is changed by one counting step (incremented; alternatively also decremented, depending on the type of realization in detail). When the maximum number for the counter reading implemented in the subscriber identity module is overshot on the occasion of a profile loading process, in this profile loading process the loading package is not extracted from the loading package (thus not loaded out therefrom) and consequently not implemented in the subscriber identity module, or is extracted (loaded), but not implemented.

Optionally, the subscriber identity module supplies a profile loading counter which is associated with one individual profile.

Optionally, the subscriber identity module, alternatively or additionally, supplies a global profile loading counter that counts all profile loading processes, in particular also for different profiles.

Thus, according to claim 1, a loading package is created in which a circumvention of use restrictions is prevented.

Checking the counter reading is effected optionally by comparing the counter reading of the profile loading counter implemented in the subscriber identity module with the counter reading from the loading package.

Optionally, the profile loading counter sequence precedes the loading sequence in the loading package, so that the subscriber identity module has to load out or extract the profile loading counter sequence from the loading package before the loading sequence.

A data preparation server according to the invention is adapted to generate a loading package supplied for transfer to a subscriber identity module.

Optionally, the data preparation server encrypts the generated loading package with a key specific to the subscriber identity module and transfers the encrypted loading package to the subscriber identity module. The loading package is decrypted in the subscriber identity module.

BRIEF DESCRIPTION OF THE DRAWINGS

In the following the invention will be explained in more detail on the basis of embodiment examples and with reference to the drawings, in which there are shown.

DETAILED DESCRIPTION OF EMBODIMENT EXAMPLES

Figure 1A:
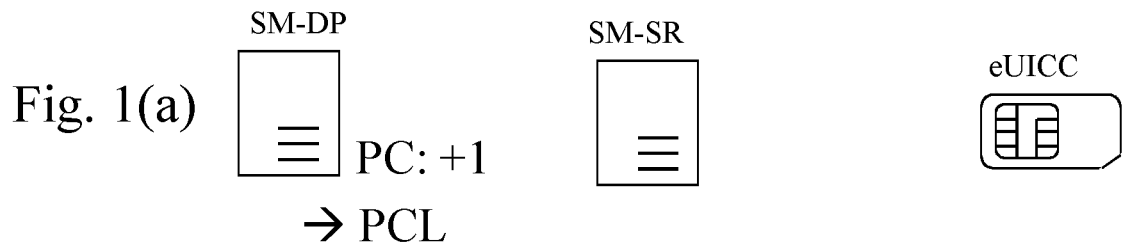
FIGS. 1(a) to 1(d) a diagram for the initial loading of a loading package from a data preparation server via a security router into a subscriber identity module, according to an embodiment of the invention.
Figure 1B:
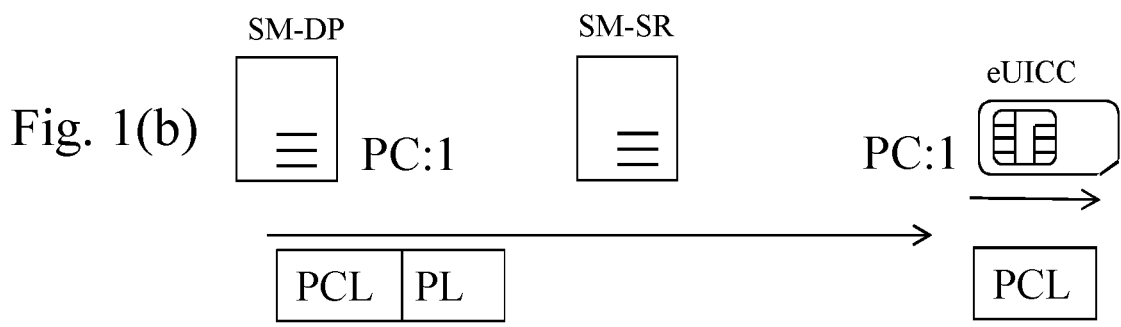
Figure 1C:
Figure 1D:
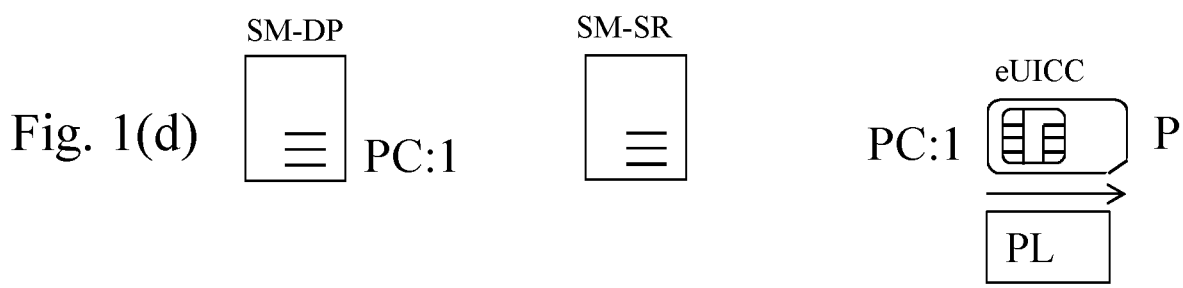

FIGS. 1(a) to 1(d) show a diagram for the initial loading of a loading package from a data preparation server SM-DP into a subscriber identity module eUICC, according to an embodiment of the invention. The loading package comprises a loading sequence PL for implementing a subscription profile P and a profile loading counter sequence PCL for implementing a profile loading counter PC, in each case in the subscriber identity module eUICC. In a step (a) the data preparation server SM-DP generates the loading package from a loading sequence PL and a profile loading counter sequence PCL. The loading sequence PL is produced on the basis of profile data P to be loaded. The profile loading counter sequence PCL is generated on the basis of the counter reading of a profile loading counter PC, which is incremented by one counting step, in the present case of the initial loading to the counter reading one. From the loading sequence PL and a profile loading counter sequence PCL the loading package is generated and encrypted with a key which is specific to the subscriber identity module eUICC. (b) The encrypted loading package is transmitted by the data preparation server SM-DP via a security router SM-SR to the subscriber identity module eUICC. The subscriber identity module eUICC decrypts the loading package. In the loading package, the profile-loading counter sequence PCL precedes the loading sequence PL for the profile P. Therefore, the subscriber identity module eUICC can only load the profile loading counter sequence PCL first out of the decrypted loading package into the subscriber identity module. In a step (c) it is then determined in the subscriber identity module that no profile loading counter PC has been implemented there yet, and the profile loading counter is newly implemented in the subscriber identity module eUICC, including the counter reading, thus one in this case, which is simultaneously the maximum admissible number of times that the profile may be implemented in the subscriber identity module eUICC here. In a step (d) the subscriber identity module eUICC now loads the loading sequence PL for the profile out of the loading package into the subscriber identity module eUICC and implements the profile P in the subscriber identity module eUICC on the basis of the loaded loading sequence PL.

Figure 2A:
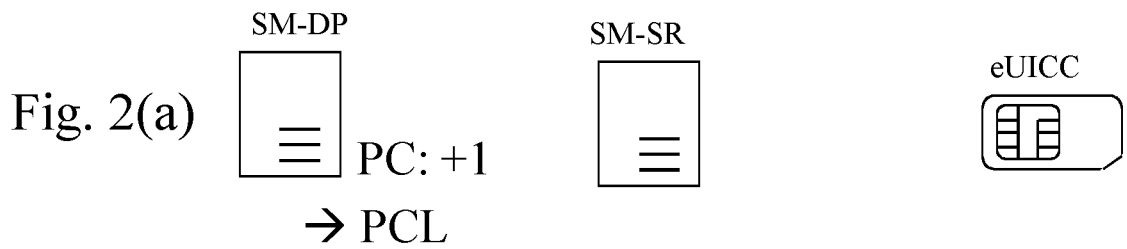
FIGS. 2(a) to 2(d) a diagram analogous to FIGS. 1(a) to 1(d) for the attempt of the security router to load the loading package into the subscriber identity module a second time.
Figure 2B:
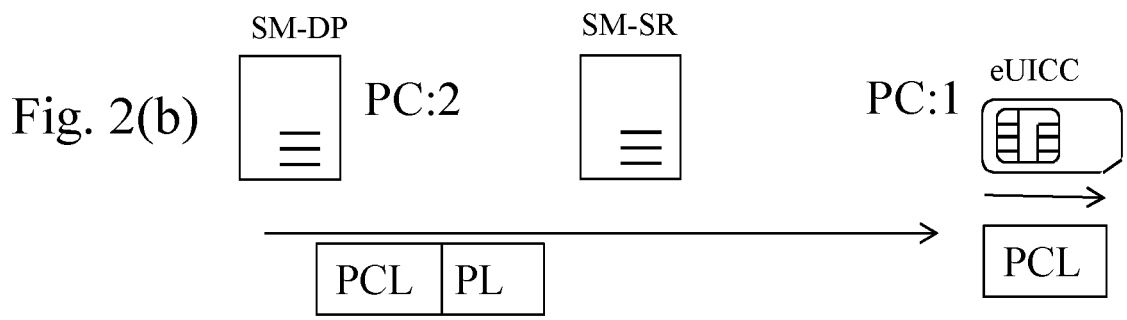
Figure 2C:
Figure 2D:
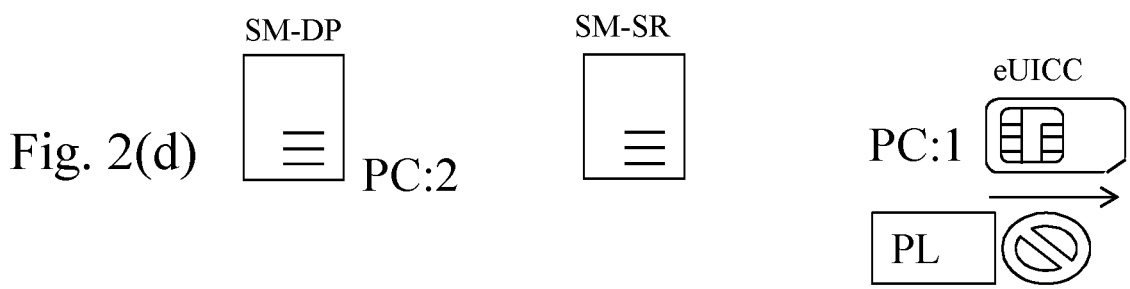

FIGS. 2(a) to 2(d) show a diagram analogous to FIGS. 1(a) to 1(d) for the attempt of the data preparation server SM-DP to load the loading package into the subscriber identity module eUICC for a second time. The data preparation server SM-DP starts by generating the loading package and supplies the profile loading sequence. (a) For this purpose, the data preparation server SM-DP increments the counter reading of the profile loading counter PC by one counting step from one to two and generates the profile loading counter sequence PCL based on this counter reading. The data preparation server SM-DP concatenates the profile loading sequence PL and the profile loading counter sequence PCL into the loading package, and encrypts the loading package with the key specific to the subscriber identity module eUICC. (b) The encrypted loading package is transmitted by the data preparation server SM-DP via a security router SM-SR to the subscriber identity module eUICC. The subscriber identity module eUICC decrypts the loading package and extracts the profile loading counter sequence PCL with the counter reading two. (c) The subscriber identity module eUICC determines that it already has an implemented profile loading counter PC and checks the counter reading from the loading package, i.e. two, in comparison to the counter reading of the profile loading counter PC implemented in the subscriber identity module eUICC, i.e. one. Thus, the counter reading overshoots the admissible number of implementation processes of the profile P. In a step (d) it is consequently prevented that the loading sequence PL is extracted (loaded) and implemented in the subscriber identity module eUICC for a second time.

Optionally, further measures are provided in the method for preventing an unauthorized data source from sending a loading package to the subscriber identity module. Optionally, it is prevented thereby that a loading package is intermediately stored and input in the subscriber identity module in an unchanged state.

Optionally, a verification token specific to the data preparation server is added to the, optionally encrypted, loading package by the data preparation server, said token being verified at the subscriber identity module after transmission of the loading package to the subscriber identity module. The loading package is accepted only upon successful verification of the verification token at the subscriber identity module. Otherwise, the profile loading counter sequence or/and the loading sequence from the loading package is/are not loaded from the loading package or/and not implemented.

Optionally, a checksum is provided as the verification token, in particular a message authentication code MAC, or alternatively a certificate.

CITED PRIOR ART

[1] 12FAST.13—Embedded SIM Remote Provisioning Architecture 17 Dec. 2013 GSMA
[2] SGP02-Remote-Provisioning-Architecture-for-embedded-UICC-Technical-Specification-v2.0, 13 Oct. 2014, GSMA

The invention claimed is:

1. A data preparation server, adapted to generate and supply a loading package to a subscriber identity module, the data preparation server comprising a memory for storing the loading package, the loading package adapted for loading a profile for a subscription into a subscriber identity module, and comprising:
   a loading sequence, through implementation of which in the subscriber identity module, the profile is set up in the subscriber identity module,
   a profile loading counter sequence,
   which is generated on the basis of a counter reading of a profile loading counter maintained at the data preparation server, said profile loading counter being changed, in particular incremented, on the occasion of a transfer of the loading package from the data preparation server to the subscriber identity module,
   wherein the profile loading counter sequence is adapted to load into the subscriber identity module a profile loading counter with a generated counter reading, and
   wherein the profile loading counter sequence is loaded into the subscriber identity module before the loading sequence for the profile, and
   wherein the loading sequence further comprises:
   in a case where no implemented profile loading counter is present in the subscriber identity module, implementing the profile-loading counter in the subscriber identity module with a counter reading which determines an admissible number of times which the loading package may be loaded into the subscriber identity module; and
   in a case where an implemented profile loading counter is already present in the subscriber identity module, checking the counter reading of said counter for whether an admissible number of times which the loading package has already been loaded into or/and implemented in the subscriber identity module is still undershot in accordance with the counter reading in the subscriber identity module, and to allow the loading or/and implementation of the loading sequence at most only if the admissible number is still undershot, and otherwise to prevent the loading or/and implementation of the loading sequence.

2. The data preparation server according to claim 1, wherein the profile loading counter sequence is adapted, for checking the counter reading, to compare the counter reading of the profile loading counter implemented in the subscriber identity module with the counter reading from the loading package as the comparative counter reading.

3. The data preparation server according to claim 1, wherein the profile loading counter sequence precedes the loading sequence in the loading package, so that the profile loading counter sequence has to be loaded before the loading sequence.

4. A method for loading a loading package from a data preparation server into a subscriber identity module, the loading package comprising:
   a loading sequence, through implementation of which in the subscriber identity module, a profile is set up in the subscriber identity module,
   wherein the method further comprises:
   at the data preparation server, generating the loading sequence for the profile;
   changing, in particular incrementing, a counter reading of a profile loading counter for the profile and generating a profile loading counter sequence on the basis of the changed counter reading;
   generating the loading package comprising the generated loading sequence and the profile loading counter sequence;
   transferring the loading package comprising the loading sequence and the profile loading counter sequence from the data preparation server to the subscriber identity module;
   before loading the loading sequence from the loading package, loading the profile loading counter sequence from the loading package into the subscriber identity module;
   in a case where no implemented profile loading counter is present in the subscriber identity module, implementing the profile-loading counter in the subscriber identity module on the basis of the profile loading counter sequence, with a counter reading which determines an admissible number of times which the loading package may be loaded into the subscriber identity module; and
   in a case where an implemented profile loading counter is already present in the subscriber identity module, checking the counter reading of said counter for whether an admissible number of times which the loading package has already been loaded into or/and implemented in the subscriber identity module is still undershot in accordance with the counter reading, and loading or/and implementing the loading sequence if the admissible number is still undershot, and otherwise preventing the loading or/and implementation of the loading sequence.

5. The method according to claim 4, wherein the checking of the counter reading is carried out by comparing the counter reading of the profile loading counter implemented in the subscriber identity module with the counter reading from the loading package as the comparative counter reading.

6. The method according to claim 4, wherein the loading package is transferred from the data preparation server via a security router to the subscriber identity module, wherein the security router has no possibility to access the profile loading counter.

7. The method according to claim 4, wherein:
the method comprises the further step of encrypting the generated loading package with a key specific to the subscriber identity module;
the transfer of the loading package is configured as a transfer of the encrypted loading package; and
the method in the subscriber identity module comprises the step of decrypting the encrypted loading package.

8. The method according to claim 4, wherein the data preparation server adds a verification token specific to the data preparation server to the, optionally encrypted, loading package, said token being verified at the subscriber identity module after the transmission of the loading package to the subscriber identity module, and
wherein the loading package is accepted at the subscriber identity module only upon successful verification of the verification token, and otherwise the profile counter loading sequence or/and the loading sequence from the loading package is not loaded or/and not implemented.

9. The method according to claim 8, wherein as the verification token, a checksum, in particular a message authentication code, or a certificate is provided.

* * * * *